United States Patent [19]
Rose

[11] 4,314,280
[45] Feb. 2, 1982

[54] ADJUSTABLE LIGHT SHIELD

[76] Inventor: Joseph K. Rose, 1960 Linden Ave., Highland Park, Ill. 60035

[21] Appl. No.: 100,475

[22] Filed: Dec. 5, 1979

[51] Int. Cl.³ .............................................. H04N 5/64
[52] U.S. Cl. ..................................... 358/255; 350/60; 362/360
[58] Field of Search ................... 358/255; 350/276 R, 350/276 SL, 58, 60; 362/351, 359, 360; 292/206; 49/39, 55, 71; 160/134, 135, 372, 377

[56] References Cited
U.S. PATENT DOCUMENTS

| | | | |
|---|---|---|---|
| 3,062,917 | 11/1962 | Rose | 358/255 |
| 3,733,436 | 5/1973 | Rose | 358/255 |

*Primary Examiner*—Joseph A. Orsino, Jr.
*Attorney, Agent, or Firm*—Kinzer, Plyer, Dorn & McEachran

[57] ABSTRACT

An adjustable shield for a lamp, a camera, a viewing screen, or other interface, comprising at least three shield panels hinged to a rectangular base and a series of corner units, each composed of two corner panels, bridging the corner gaps between the shield panels; each corner panel is slidingly mounted on one end of a shield panel by guide means, in one instance a series of pin and slot guide connections that continuously maintain the corner panels and shield panels in pivotal alignment and that also define an outer limit for angular movement of each shield panel. For maximum angular range, the corner panels of each corner unit are hinge-connected. In an alternate construction, pivotal connections for the corner units are employed in the guide means. Friction pads on the shield panels, engaging the corner panels, may be used to increase the friction contact area.

24 Claims, 20 Drawing Figures

ADJUSTABLE LIGHT SHIELD

BACKGROUND OF THE INVENTION

There are a variety of different applications for a light shield to limit the light impinging upon or radiating from a light interface such as a lamp, a camera lens, or the viewing screen of an oscilloscope or television display. In some of these applications, adjustability of the shield is a prime requirement, to meet varying operating conditions. Thus, a broad pattern of light from a lamp may be desirable in one instance, but a much narrower pattern from the same lamp may be required in another instance. On a camera, the light shield may function best in a contracted configuration for a narrow angle lens, whereas a wide angle lens may require that the light shield be opened up substantially. For a television receiver, a relatively open configuration may provide the best viewing when ambient light is minimal and several people are observing the television screen, whereas under harsh lighting conditions with a single viewer it may be preferable to narrow the shield down substantially.

Similar situations apply for shields or deflectors in other applications. Thus, an air outlet or inlet in one system may have to fit a narrow, confined pattern; in another application, a broad, spreading deflector may be needed. Sound systems may also demand a variety of interface shield or deflector configurations.

Several effective light shields for television receivers, utilizing three hinged shield panels connected at the corners by angular corner units are described in Rose U.S. Pat. No. 3,062,917. Those light shields are quite effective for many television uses, but lack of versatility necessary for other applications, especially if expansion-contraction range requirements are substantial and the dimensions of the shield are relatively large in relation to the dimensions of the interface with which it is employed. In particular, the light shields disclosed in the patent do not provide adequate means for maintaining the shield panels and corner units in accurate alignment throughout a large range of shield panel movements.

Another problem encountered in many shield and deflector applications is the need to hold the shield panels in position over a wide range of adjustment. A related difficulty is the tendency of an adjustable shield to open or close spontaneously due to vibration, movement of the interface apparatus with which the shield is associated, and other external factors; ideally, the shield, when moved to a new angular alignment, should remain steady in that alignment even though it may be moved about or subjected to vibration, jarring, or other disturbance.

In a shield of substantial depth, relative to the size of the interface with which it is employed, problems of interference between the elements used to close the corners of the shield are frequently encountered. Another difficulty arises from the fact that with any substantial change of the angular alignment of the side panels, the angles of the smaller panels used in the corner units changes substantially.

SUMMARY OF THE INVENTION

It is a principal object of the present invention, therefore, to provide a new and improved adjustable shield, adapted to use in a variety of different applications, that effectively eliminates the problems and difficulties of previously known devices as noted above.

A further object of the invention is to provide a new and improved adjustable shield, using hinged panels with interconnecting corner units, that affords firm control of the relative positions and alignments of all of the shield elements over a wide angular range of adjustment while still allowing angular adjustment of any side of the shield independently of the others.

A specific object of the invention is to provide a new and improved adjustable shield, usable in a wide variety of different applications, that effectively allows for changes of angular alignment of corner units that are used to bridge the gaps between the hinged side panels of the shield.

A further object of the invention is to provide a new and improved adjustable shield in which the shield panels can be adjusted angularly, independently of each other, over a broad range, yet which holds any adjusted configuration under at least limited conditions of external vibration, jarring, and other disturbances.

Accordingly, in one aspect the invention relates to an adjustable shield comprising a base encompassing at least three sides of an interface, at least three shield panels, each hinged to the base and projecting outwardly of one side of the interface, and at least two corner units, each composed of two corner panels interconnected along a corner line, bridging the corner gaps between adjacent-shield panels, each corner panel being paired with one of the shield panels in parallel surface alignment. The adjustable shield further comprises guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement. The guide means may comprise a series of guide pins, each affixed to one of the panels in a panel pair and extending into a guide slot in the other panel of that pair. In another construction, a pivotal connection at the base of each corner unit is utilized as part of the guide means. The two corner panels of each corner unit are preferably hinged to each other along the corner line to allow substantial changes in angular alignment of the corner panels to follow changes in angular alignment of the shield panels. Friction pads on the shield panels, in friction contact with the corner units, are utilized in some embodiments.

DESCRIPTION OF THE PREFERRED EMBODIMENTS

FIGS. 1 through 4D illustrate an adjustable shield 20 constructed in accordance with a preferred embodiment of the invention. Shield 20 may be a light shield for a lamp, a camera, or a viewing screen; it may also serve as a shield or deflector for an audio source or receiver, an air stream outlet or inlet, or a variety of other applications. Shield 20 comprises a rectangular base including four base elements 21, 22, 23 and 24 secured by suitable fastening elements 25 in encompassing relation to an interface 26. Interface 26, which is not shown in detail, could comprise the lens of a camera, the lens or other output surface of a lamp, the viewing screen of an oscilloscope or television receiver, a speaker, an air vent, etc.

Figure 1:
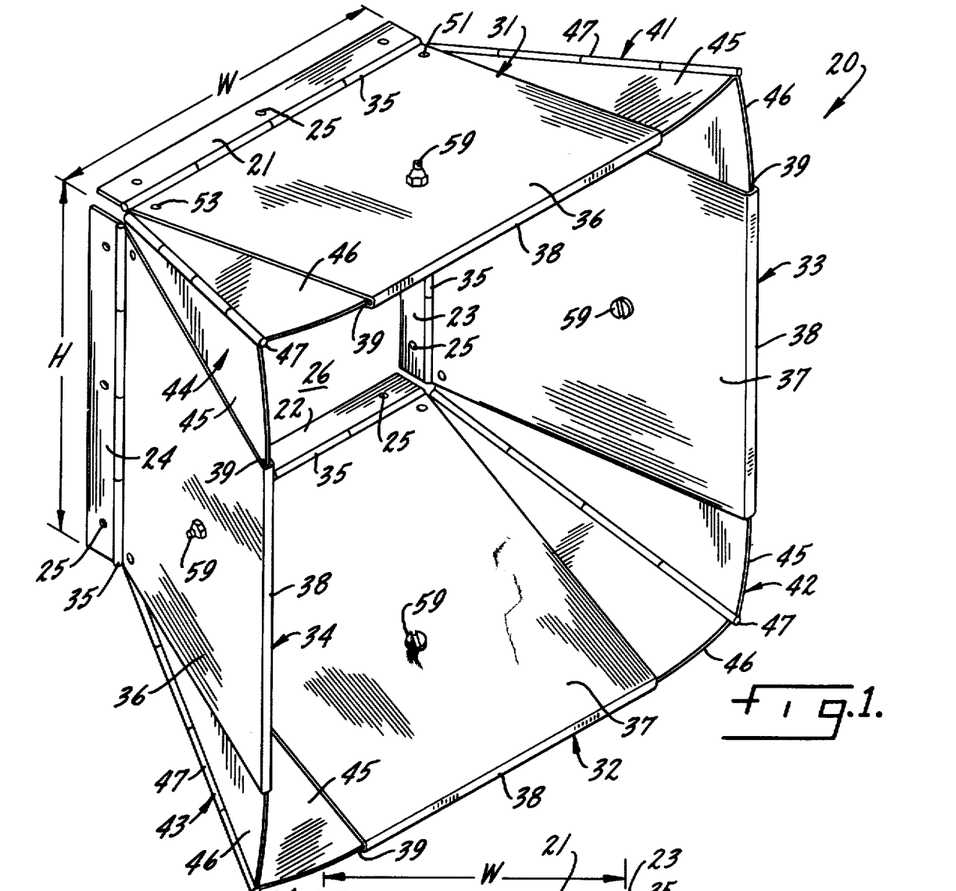
FIG. 1 is a perspective view of an adjustable shield constructed in accordance with one embodiment of the invention.
Figure 2:
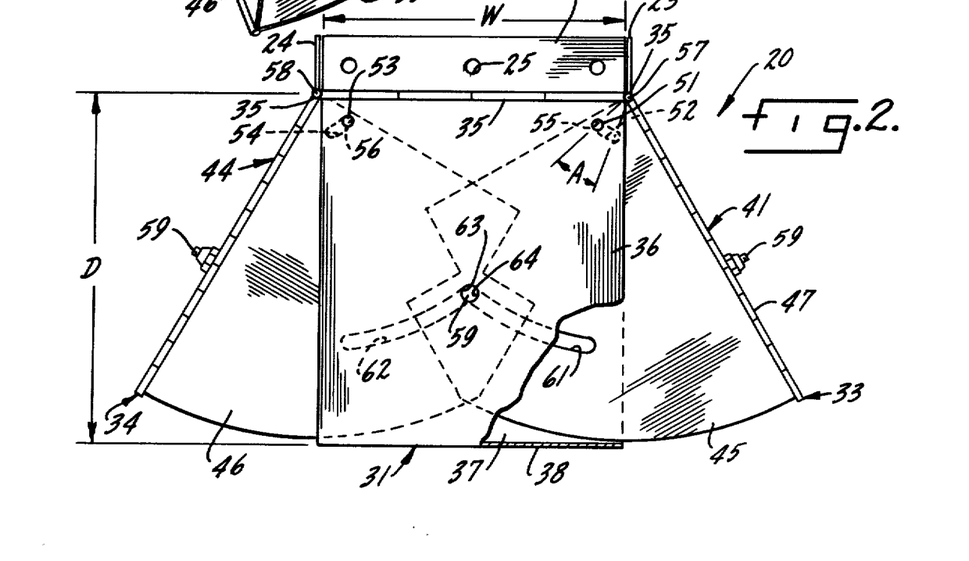
FIG. 2 is an elevation view of one side of the shield of FIG. 1.

Shield 20 further comprises four shield panels 31, 32, 33 and 34 which are hinged to the base elements 21, 22, 23 and 24, respectively, by suitable hinges 35. Each shield panel is of double-wall construction. Thus, shield panel 31 includes an outer wall 36 joined to an inner wall 37 by an end wall 38, this construction affording an inter-wall space 39 essentially co-extensive in area with the shield panel walls 36 and 37. The same construction is used for the remaining shield panels 32-34.

The adjustable shield 20 further comprises four corner units 41, 42, 43 and 44. Corner unit 41 is composed of two corner panels 45 and 46 interconnected along a corner line by an elongated hinge 47. Corner panel 45 of corner unit 41 is paired with shield panel 31, extending into the inter-wall space 39 of the shield panel in parallel surface alignment with the shield panel side walls 36 and 37. Similarly, corner panel 46 of unit 41 is paired with shield panel 33, projecting into the inter-wall space 39 of panel 33 in parallel surface alignment with the side walls of that panel.

The remaining corner units 42-44 of shield 20 correspond in construction to corner unit 41. Each is composed of two corner panels 45 and 46 interconnected along a corner line by a hinge 47, with each corner panel being paired with one of the shield panels in parallel surface alignment. The corner units 41-44 effectively bridge the corner gaps between adjacent shield panels 31-34 to afford a complete shield encompassing all sides of interface 26.

Shield 20 includes guide means for slidingly mounting each corner unit 41-44 on two adjacent shield panels 31-34; the guide means further defines an outer limit for a range of angular movement for each of the shield panels 31-34 and maintains each corner unit 41-44 in pivotal alignment with the associated shield panels throughout their ranges of angular movement.

The guide means for shield 20 is best illustrated in FIG. 2. As shown therein, a guide pin 51 is affixed to shield panels 31; guide pin 51 extends through both the outer and inner side walls 36 and 37 of shield panel 31 and through an arcuate guide slot 52 in the corner panel 45 of corner unit 41 that is paired with shield panel 31. A similar guide is provided for the corner panel 46 of corner unit 44 that is paired with shield panel 31 at its opposite side. Thus, a guide pin 53 is affixed to and extends through the full thickness of shield panel 31, engaging in an arcuate guide slot 54 in corner panel 46 of unit 44. The same construction is applied throughout shield 20.

One end 55 of guide slot 52 in corner panel 45 (FIG. 2) may define an outer limit for a range of angular movement for the other shield panel 33 that is associated with corner unit 41. In the same manner, one end 56 of the arcuate guide slot 54 in corner panel 46 may define an outer limit for a range of angular movement for the other shield panel 34 that is associated with corner unit 44. The center of the arc for guide slot 52 is coincident with the axis 57 of the hinge 35 for shield panel 33. The center for the arcuate slot 54 is on the axis 58 for the hinge 35 of panel 34. With this construction, the guide means comprising pins 51 and 53 and guide slots 52 and 54 effectively maintains the corner units 41 and 44 in pivotal alignment with the associated shield panel 31 throughout the ranges of angular movement for the adjacent shield panels 33 and 34.

The depth D of shield 20 is of the same order of magnitude as the width W and the height H of base 21-24. Moreover, the range of angular movement for any one of the shield panels, represented by the angle A in FIG. 2 is substantial, of the order of thirty degrees or even more. In consequence, the dimensions of the corner panels 45 and 46 are such that they overlap within shield panel 31 as shown in FIG. 2. Thus, it is readily possible and desirable to provide additional guide means to supplement pins 51 and 53 and slots 52 and 54 in controlling the alignment of the shield components.

This additional guide means comprises a pin 59 that is affixed to shield panel 31, extending completely through the inter-wall space of the shield panel between its side walls 36 and 37. Guide pin 59 extends through a guide slot 61 in corner panel 45 of corner unit 41 and through another guide slot 62 in corner panel 46 of corner unit 44. The center of the arc for slot 61 is the hinge axis 57 for shield panel 33 whereas the center of the arc of slot 62 is the axis 58 of the hinge for shield panel 34. It is thus seen that the guide means comprising pin 59 and slots 61 and 62 directly complements and supplements the previously described guide means comprising pins 51 and 53. As in the case of slots 52 and 56, the end surfaces 63 and 64 of slots 61 and 62 can be utilized to define the outer limits of the ranges of angular movement for shield panels 33 and 34. It will be recognized that in some instances it will not be necessary to provide two guides for each corner panel, though this construction is preferred; moreover, the second guide means (pin 59 and slots 61 and 62) can be made individual to the two corner panels in each shield panel, particularly if there is no overlap between the corner panels.

Figures 3A, 3B, 3C:
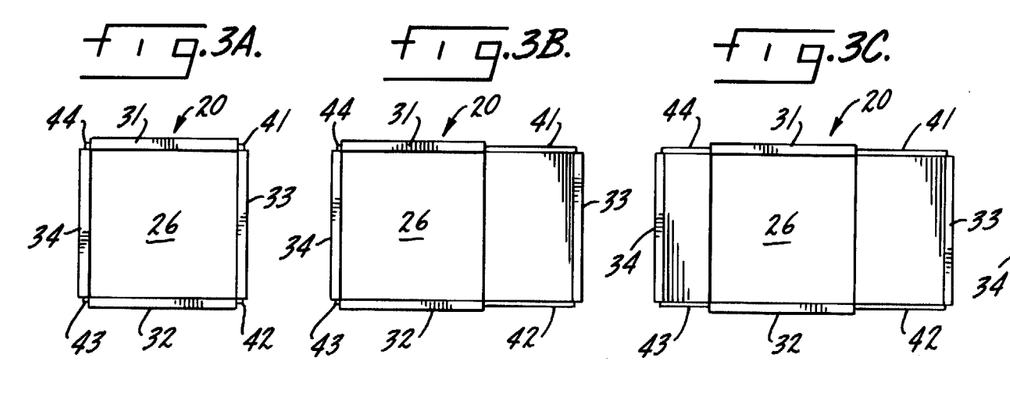
FIGS. 3A through 3D are a series of simplified end views of the adjustable shield of FIGS. 1 and 2, illustrating various operating positions for the shield panels.
Figure 3D:
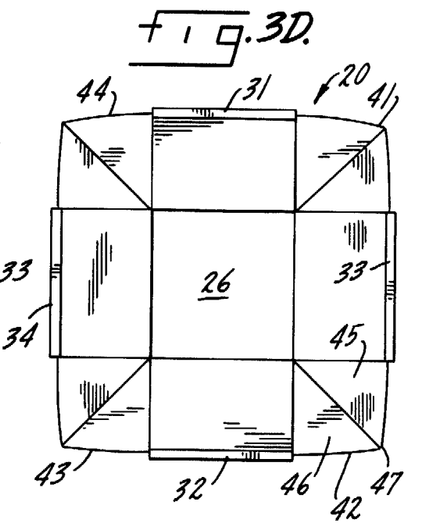
Figures 4A, 4B:
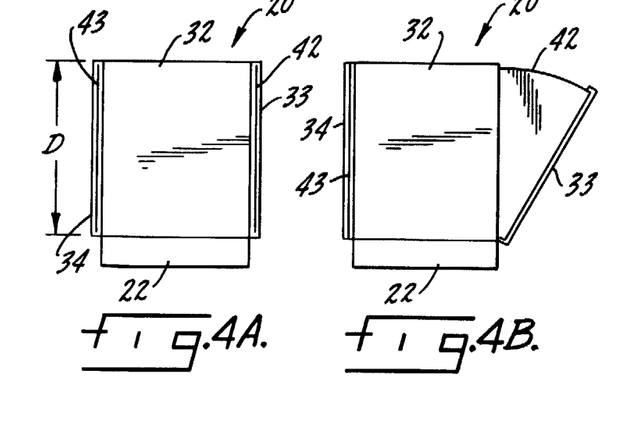
FIGS. 4A through 4D are a series of simplified elevation views corresponding to FIGS. 3A through 3D.

The extreme versatility and flexibility of shield 20, in use, can best be understood by reference to FIGS. 3A through 3D and 4A through 4D. In FIGS. 3A and 4A, shield 20 is shown in its full closed condition in which access to interface 26 is limited to the same surface area as the interface extended out through the depth D of the shield. To enlarge the access angle in one direction only, shield panel 33 can be pulled out to the position shown in FIGS. 3B and 4B without changing the positions of any of the other shield panels. The corner units 41 and 42 continue to bridge the gaps between shield panel 33 and panels 31 and 32.

Figure 4C:
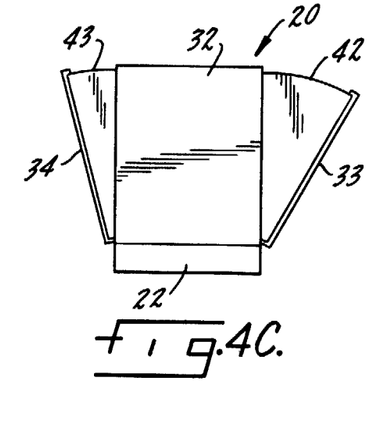
Figure 4D:
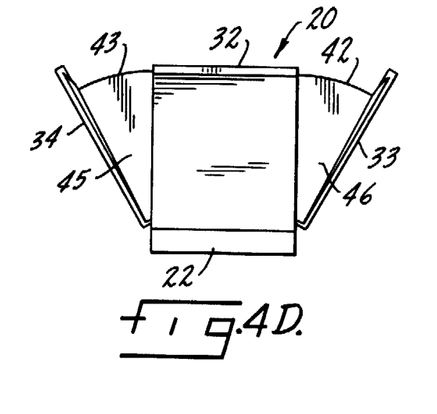

For a different application, it may be desirable to enlarge the access afforded by shield 20 to the maximum extent on the one side, covered by shield panel 33, and to a lesser extent on the opposite side, covered by shield panel 34, with continued minimum angular access from the sides covered by shield panels 31 and 32. This condition is shown in FIGS. 3C and 4C. A variety of other intermediate alignments for the individual shield panels is readily attainable, with the full maximum access being as shown in FIGS. 3D and 4D, in which all of the shield panels are extended to the outer limits of their angular ranges.

In shield 20, each of the corner panels of the four corner units is maintained in frictional contact with one side wall of the shield panel with which that corner panel is paired and with the other corner panel that it overlaps within the same shield panel. This condition is generally illustrated in FIG. 2, in which it can be seen that the overlapping arrangement of corner panel 45 of corner unit 41 and corner panel 46 of unit 44 is such that the corner panel 45 is immediately adjacent the outer wall 36 of shield panel 31. Corner panel 46 of unit 44, on the other hand, is in frictional contact with the inner wall 37 of shield panel 31. The construction of the guide pins 51, 53 and 59 is such that an effective clamping arrangement is maintained, holding the corner panels in the angular positions to which they are set by movement of the associated shield panels. This frictional gripping arrangement can easily be made to hold the shield 20 in any of its desired configurations (see FIGS. 3A through 3D and 4A through 4D) despite substantial vibration, jarring, and other disturbances.

As shown in FIG. 3D, with the shield panels fully extended the angles between those panels are substantially enlarged from the original ninety degree relationship shown in FIGS. 3A through 3C. Thus, with shield panels 32 and 33 both pulled out to an angle of approximately thirty degrees from the original vertical alignment relative to the base of the shield, the angle between those panels is approximately 106°, an increase of sixteen degrees from the original right angle relationship. This angular change in the shield panels will cause binding of the corner panels paired with them as the shield panels are opened or closed; to accommodate the change in shield panel angles, the angles between the corner panels must be permitted to change accordingly. This accommodation is provided by the corner unit hinges 47.

The double wall construction for the shield panels is used primarily to afford increased friction contact area between the shield panels and the corner panels. The central guide pin 59 can be tightened or loosened, affording a convenient adjustment for the friction between the shield panels and the corner panels. In some applications for shield 20, esthetic considerations may make it desirable to mask the guide means, particularly the guide slots 52, 54, 61 and 62, as much as possible. This is also accomplished with the double wall construction. Fabric hinges or thin plastic hinges may be utilized in the construction of shield 20, if desired, either to improve the appearance of the shield or for cost reduction purposes. The shield panels and corner panels may be fabricated from relatively rigid sheet plastic, from sheet metal, or from virtually any other suitable material. Of course, the opacity, surface finish, and other characteristics of the components of shield 20 may be readily adapted to the requirements of the environment in which the shield is to be employed.

Figures 5, 6C:
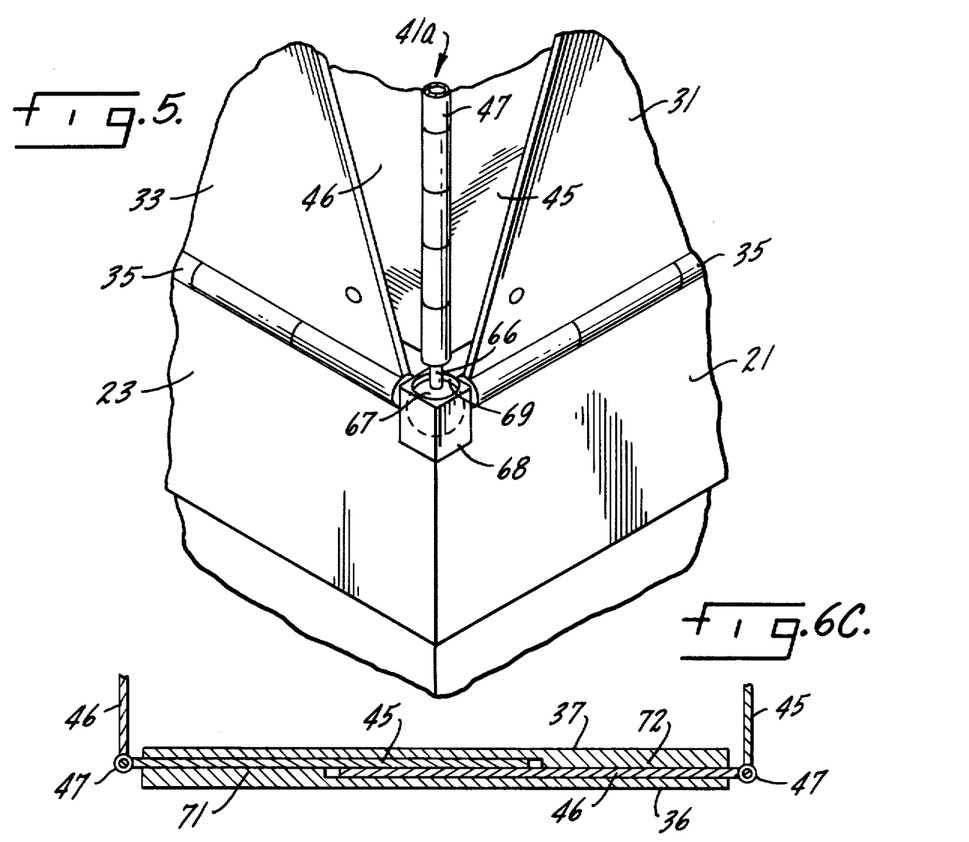
FIG. 5 is a detail view showing a modified guide structure for the adjustable shield of FIGS. 1 and 2.
FIG. 6C is a sectional view showing the friction pad modification.

FIG. 5 illustrates an alternate construction that may be adopted to replace all or a portion of the guide means described above or to supplement those guide means. The corner unit 41 described above in that it comprises two corner panels 45 and 46 joined along the corner line by a hinge 47. In this instance, the hinge pin 66 is extended beyond the end of the hinge adjacent base members 21 and 23 and a small ball 67 is mounted on the end of the hinge pin. Ball 67 is fitted into a socket 68 mounted at the corner of the base 21,23. The opening 69 at the top of socket 68, through which hinge pin 66 extends, is made large enough to permit hinge pin 66 to move in any direction as required, but small enough to keep ball 67 confined in socket 68. The center of ball 67 is coincident with the intersection of the axis of the two adjacent shield panel hinges so that the corner panels of corner unit 41A are maintained in the correct pivotal alignment relative to the shield panels at all positions within the range of angular movement for each shield panel.

It will be recognized that if the hinge 47 is formed as a flexible membrane or in any other construction that does not afford a hinge pin, the ball-and-socket guide means can still be employed by mounting the ball 67 on a separate rod or pin extending downwardly from the hinge in alignment with the hinge axis, in the same manner as the illustrated extension of hinge pin 66.

Figure 6:
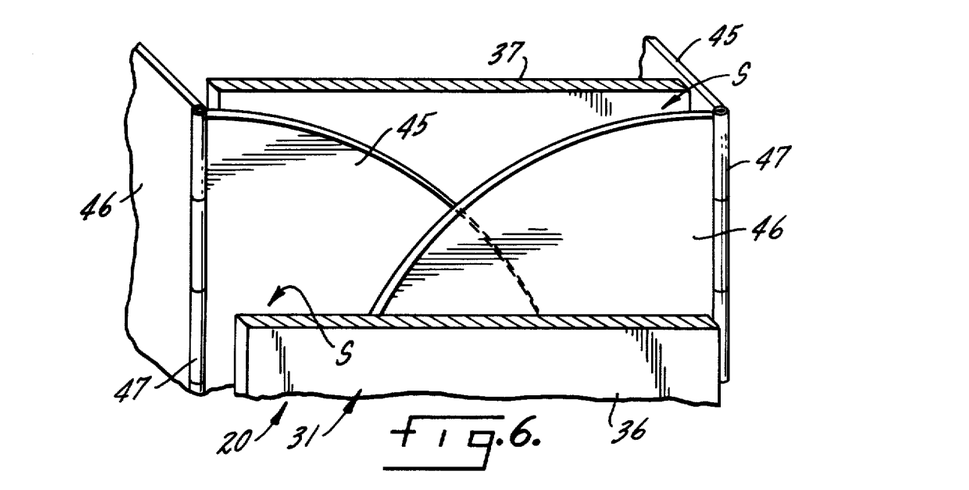
FIG. 6 is a cut-away detail view of a part of the shield of FIGS. 1 and 1.

The shield panels and the corner panels are held in place, in any part of their adjustment ranges, by the frictional contact between the corner panels and the walls of the shield panels. When the corner panels overlap, as in the construction shown in FIGS. 1-4D and in FIG. 6, each corner panel is in friction contact with only one wall of the shield panel, being separated from the other wall of the shield panel by the second, overlapping corner panel paired with the same shield panel. Thus, as shown in FIG. 6, corner panel 45 contacts only the outer wall 36 of shield panel 31, whereas corner panel 46 contacts only the inner wall 37 of the shield panel. The spacing between the corner panels and side panels in generally indicated by arrows S in FIG. 6. There is no frictional contact between corner panel 45 and shield panel wall 37, and corner panel 46 has no friction contact with shield panel wall 36.

Figure 6A:
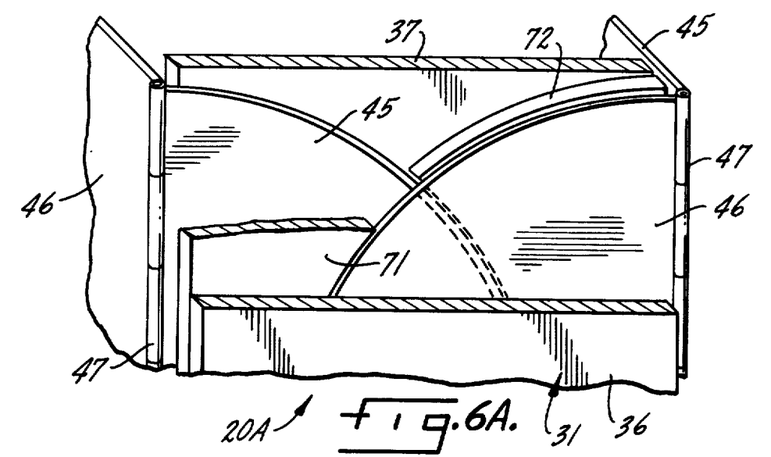
FIGS. 6A and 6B are detail views of a modification incorporating friction pads for greater stability of the shield.
Figure 6B:
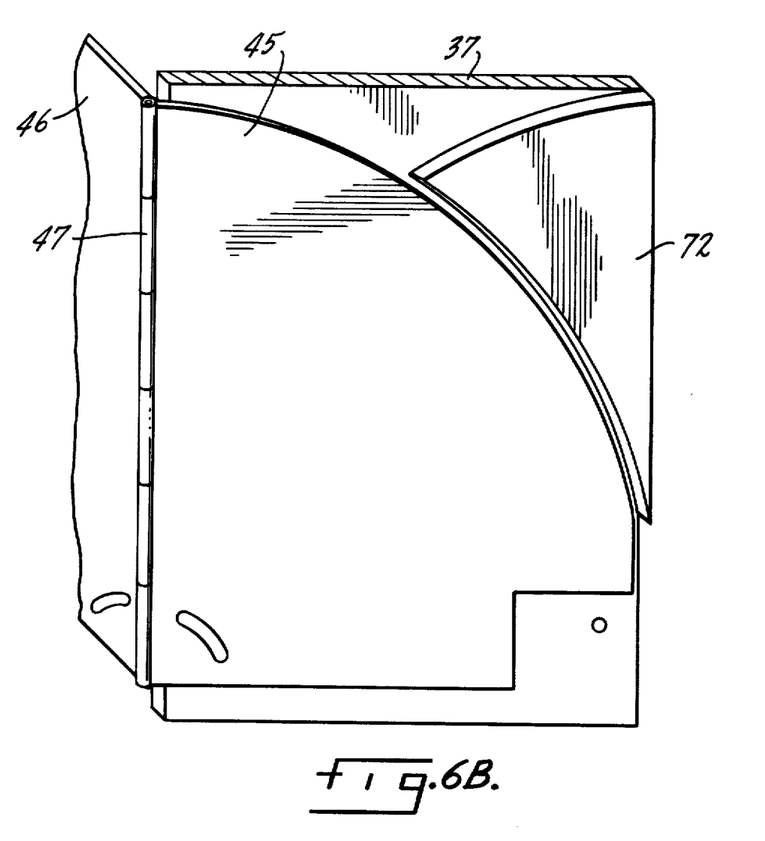

In the shield 20A shown in FIGS. 6A-6C, however, a friction pad 72 is mounted on the inner surface of shield wall 37 in a position clear of corner panel 46 of unit 44. Friction pad 72 serves as an extension of shield wall 37, into space 39, affording an appreciable area of effective friction contact with corner panel 45. A similar friction pad or panel segment 71 is mounted at the other side of shield panel 31, on the inner surface of wall 36, in frictional contact with corner panel 46 of unit 44. The additional frictional contact afforded by these friction pads, such as pads 71 and 72, provide improved stability for the shield. The friction pads also serve as reinforcement for the outer edges of the shield panel, making the entire shield structure sturdier and stiffer. The added friction area is at the outer edge of each shield panel where it is most effective; some benefit from elimination of possible rattles is also realized.

Figures 7, 8, 9:
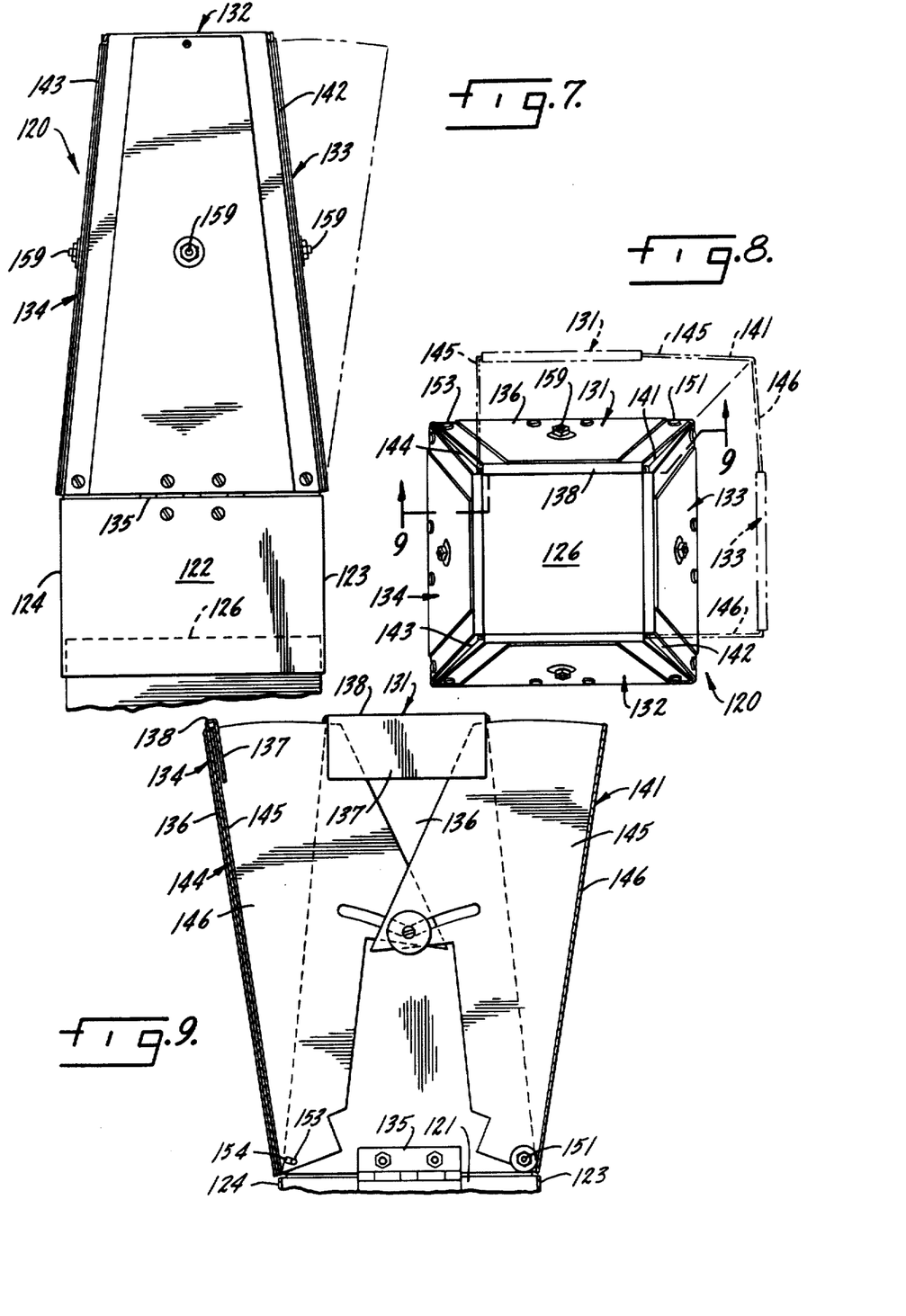
FIG. 7 is an elevation view of an adjustable shield constructed in accordance with another embodiment of the invention.
FIG. 8 is an end view of the shield of FIG. 7.
FIG. 9 is an elevation view of the inside of one panel of the shield of FIGS. 7 and 8, taken approximately along line 9—9 in FIG. 8.

FIGS. 7 through 9 illustrate an adjustable shield 120 constructed in accordance with another preferred embodiment of the invention. Shield 120 comprises a rectangular base including four base elements 121, 122, 123 and 124 that may be secured by suitable fastening elements (not shown) in encompassing relation to an interface 126. As before, interface 126 may comprise the lens of a camera, the lens or other output surface of a lamp, a viewing screen, an air vent, or other interface.

In shield 120, there are four shield panels 131, 132, 133 and 134 which are hinged to the base elements 121, 122, 123 and 124, respectively, by suitable hinges 135. Each of these shield panels is of only partial double-wall construction. Thus, panel 131 includes an outer wall 136 joined to a short inner wall 137 by an end wall 138. The same construction is employed for the other shield panels 132–134.

There are four corner units 141, 142, 143 and 144 in shield 120. Each corner unit 141 comprises two corner panels 145 and 146 interconnected along a corner line; in this embodiment, however, there are no hinges in the corner units. As shown in FIGS. 8 and 9, corner panel 145 of unit 141 is paired with shield panel 131, extending into an interwall space therebetween the outer wall 136 and the truncated inner wall 137 of panel 131. Similarly, corner panel 146 of unit 144 is paired with panel 131, projecting into the space between the outer wall 136 and the short inner wall 137 of the shield panel. A corresponding construction is utilized for all of the other corner units and shield panels in shield 120.

The guide means for the corner units in shield 120 is best illustrated in FIG. 9. A guide pin 153 affixed to shield panel 131 extends through an arcuate guide slot 154 in corner panel 146 of corner unit 144. Another guide pin 159 affixed to the center portion of panel 131 projects through an arcuate guide slot 162 that is also formed in corner panel 146 of unit 144. Because shield panel 131 has no complete inner wall, retainers such as the washer 163 are used on the inner ends of the guide pins. As clearly shown in FIG. 9, the ends of guide slots 154 and 162, by engaging the related guide pins 153 and 159, define the outer limit for the range of angular movement for corner unit 144 and for the other shield panel associated with that corner unit, panel 134. The guide arrangement for corner unit 141 is the same. It includes a corner guide pin 151 that engages in an arcuate slot (not shown) in corner panel 145 of unit 141 and another guide slot 161 engaging the central guide pin 159. Accordingly, the guide means, as described, effectively maintains all of the corner units 141–144 in pivotal alignment with the associated shield panels throughout their ranges of angular movement.

The general versatility of shield 120 is essentially similar to shield 20 except that the overall angular range for the individual shield panels is quite limited. If a greater range of angular displacement were desired for the shield panels in shield 120, hinge connections would be used for corner units 141–144, as in the previously described embodiment.

All of the illustrated shield structures afford firm control of the relative positions and alignments of all of the shield elements over a substantial angular range while allowing angular adjustment of any side of the shield independently of the others. For any adjusted configuration of the shield, at least limited conditions of external vibration, jarring, and other disturbances can be toleranted without causing a change in the shield panel alignment.

Figure 10:
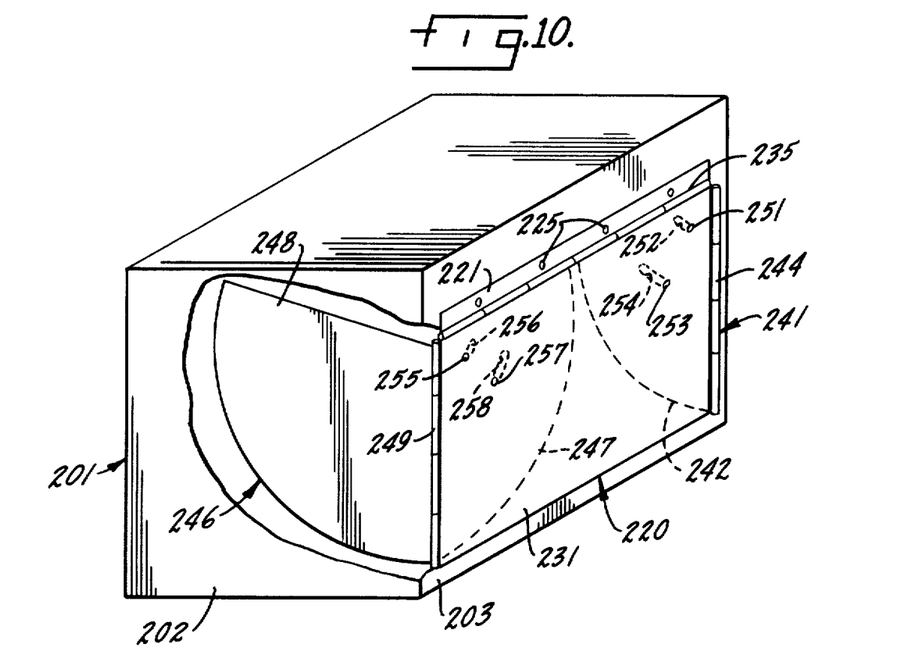
FIGS. 10 and 11 are perspective views of another embodiment of the invention, comprising a simplified three-sided shield, in closed and open positions, respectively.
Figure 11:
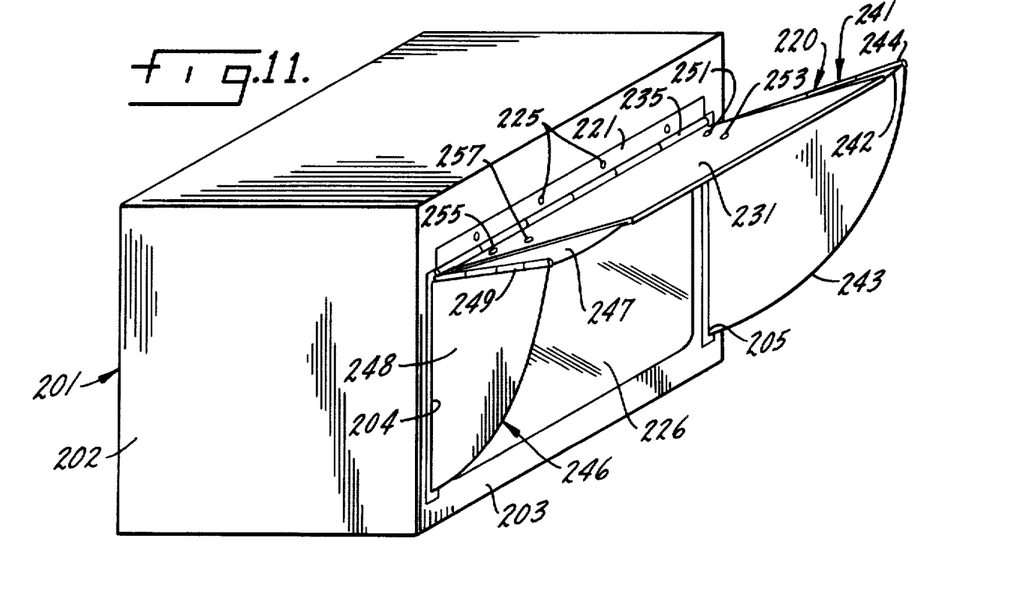

FIGS. 10 and 11 illustrate a simplified three-sided shield 220 comprising another embodiment of the invention. Shield 220 includes a shield panel 231 of double wall construction, similar to shield panel 31 (FIGS. 1–4D) hingedly connected to a base member 221 by a hinge 235; the base member 221 is mounted on the front wall 203 of a cabinet 201, by suitable fasteners 225. Cabinet 201, for example, may house a television receiver having a viewing screen interface 226.

Shield 220 includes two corner units 241 and 246. Corner unit 246 includes two corner panels 247 and 248 joined along a corner line, preferably by a hinge 249. Corner panel 248 extends into the inter-wall space in shield panel 231. Guide means are provided for maintaining corner unit 246 in pivotal alignment with shield panel 231 and for defining outer limits for a range of angular movement of the corner unit relative to the shield panel; this guide means includes two guide pins 255 and 257 mounted on shield panel 231 and extending through slots 256 and 258, respectively, in the one corner panel 247. The other corner panel 248 of unit 246 fits into a recess 204 adjacent one side wall 202 of cabinet 201, as shown in FIG. 10, but can be pulled outwardly to a position clear of the cabinet as seen in FIG. 11.

The other corner unit 241 of shield 220 is of similar construction; it includes two corner panels 242 and 243, preferably joined by a hinge 244. Corner panel 242 extends into the interwall space in shield panel 231, with guide means comprising two guide pins 251 and 253 mounted on shield panel 231 extending through slots 252 and 254, respectively, in corner panel 242. Corner panel 243 fits into a recess 205 in the far side of cabinet 201, as seen in FIG. 11.

In considering the use of shield 220, it is most convenient to start from the position shown in FIG. 10, in which shield panel 231 covers the interface (viewing screen 226) in the front wall 203 of cabinet 201 and the corner panels 243 and 248 are tucked away in the cabinet recesses 204 and 205. From that position, shield panel 231 is pulled out and up, pivoting at the hinge 235, to the position shown in FIG. 11, exposing the interface 226. This moves the corner panels 243 and 248 out of cabinet 201; they can now be pulled outwardly from shield panel 231 to afford an outwardly expanding angle of access to interface 226. The guides afforded by the pin and slot connections between shield panel 231 and corner panels 242 and 247 assure maintenance of effective pivotal alignment for the shield components over a wide range of angular positions. In this construction it will be recognized that the corner panels 243 and 248 constitute the side panels of the shield.

Although pin-and-slot guide means are shown for shield 220, it will be recognized that at least a part of the guide function can be achieved with a pivotal connection of the type shown in FIG. 5. If the corner panels overlap within the shield panel, the friction pad construction described in connection with FIGS. 6A and 6B may be desirable.

I claim:

1. An adjustable shield comprising:

a base encompassing at least three sides of an interface;

at least three shield panels, each hinged to the base and projecting outwardly of one side of the interface, at least on shield panel comprising two side walls separated by an interwall space and joined along their outer edges by an end wall;

at least two corner units, each composed of two corner panels interconnected along a corner line, bridging the corner gaps between adjacent shield panels, each corner panel being paired with one of the shield panels in parallel surface alignment and two of the corner panels being aligned with and extending into the interwall space of the one shield panel in overlapping relation to each other;

guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement; and each shield side wall of the one shield panel includes a friction pad projecting into the inter-wall space into engagement with the non-overlapping portion of the corner panel in that space which is fartheset from that shield panel wall.

2. An adjustable shield according to claim 1 in which the two corner panels of each corner unit are hinged to each other along the corner line of the corner unit to allow a substantial change in angular alignment of the corner panels of each corner unit.

3. An adjustable shield comprising:

a base encompassing at least three sides of an interface;

at least three shield panels, each hinged to the base and projecting outwardly of one side of the interface;

at least two corner units, each composed of two corner panels interconnected along a corner line, bridging the corner gaps between adjacent shield panels, each corner panel being paired with one of the shield panels in parallel surface alignment;

the dimensions of the central shield panel and the corner panels being such that two of the corner panels from different corner units are disposed in overlapping relation to each other in paired alignment with a central shield panel;

and guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement, the guide means comprising a series of guide pins, each affixed to one of the panels in a panel pair and extending into a guide slot in the other panel of that pair, one guide pin being affixed to the central shield panel and extending into individual guide slots in each of the two overlapping corner panels.

4. An adjustable shield comprising:

a rectangular base encompassing all four sides of an interface;

four shield panels, each hinged to the base and projecting outwardly of one side of the interface;

four corner units, each composed of two corner panels interconnected along a corner line and bridging the corner gap between two adjacent shield panels, each corner panel being paired with one of the shield panels in parallel surface alignment, two corner panels from different corner units being disposed in overlapping relation to each other in paired alignment with each shield panel;

and guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement, the guide means comprising a series of guide pins, each affixed to one of the panels in a panel pair and extending into a guide slot in the other panel of that pair, the guide means including four central guide pins, one affixed to each shield panel, each central guide pin extending into individual guide slots in each of the two associated overlapping corner panels.

5. An adjustable shield according to claim 3 or claim 4, in which the two corner panels of each corner unit are hinged to each other along the corner line of the corner unit to allow a substantial change in angular alignment of the corner panels of each corner unit.

6. An adjustable shield according to claim 3 or claim 4, in which:

each guide pin is affixed to a shield panel and extends into a guide slot in at least one corner panel, each shield panel comprises two side walls separated by an inter-wall space and joined along their outer edges by an end wall, and the corner panels are aligned with and extend into the inter-wall spaces of the shield panels.

7. An adjustable shield according to claim 6 in which the two corner panels of each corner unit are hinged to each other along the corner line of the corner unit to allow a substantial change in angular alignment of the corner panels of each corner unit.

8. An adjustable shield according to claim 3 or claim 4 in which:

at least one shield panel comprises two side walls separated by an inter-wall space and joined along their outer edges by an end wall, two corner panels are aligned with and extend into the inter-wall space of the one shield panel in overlapping relation to each other, and each shield side wall of the one shield panel includes a friction pad projecting into the inter-wall space into friction contact with the non-overlapping portion of the corner panel in that space which is farthest from that shield panel wall.

9. An adjustable shield according to claim 8 in which the two corner panels of each corner unit are hinged to each other along the corner line of the corner unit to allow a substantial change in angular alignment of the corner panels of each corner unit.

10. An adjustable shield comprising:

a base encompassing at least three sides of an interface;

at least three shield panels, each hinged to the base and projecting outwardly of one side of the interface;

at least two corner units, each composed of two corner panels interconnected along a corner line, bridging the corner gaps between adjacent shield panels, each corner panel being paired with one of the shield panels in parallel surface alignment, the two corner panels of each corner unit being hinged to each other along the corner line to allow a substantial change in angular alignment of the corner panels;

each corner unit including a pivot pin extending toward the base, in alignment with the axis of the hinge for that corner unit, each such pivot pin being pivotally connected to the base, guide means for mounting each corner unit in aligned sliding relation to two adjacent shield panels; and limit means for defining a fixed range of angular movement for each of the shield panels.

11. An adjustable shield according to claim 10 in which the guide means and limit means are combined, comprising a series of guide pins affixed to the shield panels and extending into arcuate slots in the corner panels.

12. An adjustable shield according to claim 10 in which each corner unit hinge includes a hinge pin, and in which each pivot pin constitutes an extension of the related hinge pin.

13. An adjustable shield according to claim 10, or claim 11, or claim 12 in which the pivotal connection between each pivot pin and the base is a ball and socket joint.

14. An adjustable shield according to claim 10, or claim 11, or claim 12, in which:

each shield panel comprises two side walls separated by an inter-wall space and joined along their outer edges by an end wall, and the corner panels are aligned with and extend into the inter-wall spaces of the shield panels, the shield walls masking major portions of the guide means and the limit means.

15. An adjustable shield according to claim 10, or claim 11, or claim 12, in which the dimensions of one central shield panel and the adjacent corner panels are such that the two adjacent corner panels are disposed in overlapping relation to each other in paired alignment with the central shield panel.

16. An adjustable shield according to claim 10, or claim 11, or claim 12, including a rectangular base encompassing all four sides of the interface, and including four shield panels and four corner units, in which two corner panels from different corner units are disposed in overlapping relation to each other in paired alignment with each shield panel.

17. An adjustable shield according to claim 10, or claim 11, or claim 12, in which:

at least one shield panel comprises two side walls separated by an inter-wall space and joined along their outer edges by an end wall, two corner panels are aligned with and extend into the inter-wall space of the one shield panel in overlapping relation to each other, and each side wall of the one shield panel includes a friction pad projecting into the inter-wall space into friction contact with the non-overlapping portion of the corner panel in that space which is farthest from that shield panel wall.

18. An adjustable shield comprising:

a base encompassing at least three sides of an interface;

a shield panel, hinged to the base along the top of the interface;

two corner units, each composed of two corner panels hingedly interconnected along a corner line, a first corner panel of each unit being paired with the shield panel in parallel surface alignment;

guide means for slidingly mounting each corner unit in aligned relation to the shield panel, the guide means defining a fixed range of angular movement for each of the corner units relative to the shield panel and maintaining each corner unit in pivotal alignment with the shield panel;

the second corner panel of each corner unit constituting a side panel for the shield;

each corner unit including a pivot pin extending toward the base, in alignment with the corner line;

and each pivot pin is connected to the base by a pivotal joint.

19. An adjustable shield according to claim 18 in which the guide means comprises a plurality of guide pins affixed to the shield panel and extending into guide slots in the first corner panels.

20. An adjustable shield according to claim 18 or claim 19, in which:

the shield panel comprises two side walls separated by an inter-wall space and joined along their outer edges by an end wall;

the first corner panels extend into the inter-wall space in the shield panel in overlapping relation to each other, and each side wall of the shield panel includes a friction pad projecting into the inter-wall space into engagement with the non-overlapping portion of the corner panel in that space which is farthest from that shield panel wall.

21. An adjustable shield comprising:

a base encompassing at least three sides of an interface;

three shield panels, each hinged to the base and projecting outwardly of one side of the interface by a predetermined distance;

at least two corner units, each composed of two corner panels interconnected along a corner line, bridging the corner gaps between adjacent shield panels, each corner panel being paired with one of the shield panels in parallel surface alignment;

the dimensions of the central shield panel and the corner panels being such that two of the corner panels from different corner units are disposed in overlapping relation to each other in paired alignment with the central shield panel;

and guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement, the guide means comprising a series of corner guide pins, equal in number to the number of corner panels, each corner guide pin being affixed to one of the panels in a panel pair and extending into an arcuate guide slot in the other panel of that pair, the corner guide pin and arcuate slot for each panel pair being displaced from the corner of the shield panel of the pair that is hinged to the base by only a minor fractional portion of said predetermined distance;

and a central guide pin affixed to the central shield panel and extending into individual guide slots in each of the two overlapping corner panels.

22. An adjustable shield comprising:

a rectangular base encompassing all four sides of an interface;

four shield panels, each hinged to the base and projecting outwardly of one side of the interface by a predetermined distance;

four corner units, each composed of two corner panels interconnected along a corner line, bridging the corner gaps between adjacent shield panels, each corner panel being paired with one of the shield panels in parallel surface alignment;

two corner panels from different corner units being disposed in overlapping relation to each other in paired alignment with each shield panel;

and guide means for slidingly mounting each corner unit on two adjacent shield panels, for defining an outer limit for a range of angular movement for each of the shield panels, and for maintaining each corner unit in pivotal alignment with the associated shield panels throughout their ranges of angular movement, the guide means comprising a series of corner guide pins, equal in number to the number of corner panels, each corner guide pin being affixed to one of the panels in a panel pair and extending into an arcuate guide slot in the other panel of that pair, the corner guide pin and arcuate slot for each panel pair being displaced from the corner of the shield panel of the pair that is hinged to the base by only a minor fractional portion of said predetermined distance;

the guide means further comprising four central guide pins, one affixed to each shield panel, each central guide pin extending into individual guide slots in each of the two associated overlapping corner panels.

23. An adjustable shield according to claim 21, or claim 22, in which the two corner panels of each corner unit are hinged to each other along the corner line of the corner unit to allow a substantial change in angular alignment of the corner panels of each corner unit.

24. An adjustable shield according to claim 23 in which:

each guide pin is affixed to a shield panel and extends into a guide slot in at least one corner panel, each shield panel comprises two side walls separated by an inter-wall space and joined along their outer edges by an end wall, and the corner panels are aligned with and extend into the inter-wall spaces of the shield panels.

* * * * *